United States Patent
Abels et al.

(10) Patent No.: US 7,890,447 B2
(45) Date of Patent: Feb. 15, 2011

(54) INFORMATION HANDLING SYSTEM AND METHOD FOR DIAGNOSIS, AND REPAIR, USING RULES COLLECTED BY FORWARD CHAINING

(75) Inventors: Timothy E. Abels, Pflugerville, TX (US); Brian Janosky, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 675 days.

(21) Appl. No.: 11/931,012

(22) Filed: Oct. 31, 2007

(65) Prior Publication Data

US 2009/0112786 A1 Apr. 30, 2009

(51) Int. Cl.
*G06F 17/00* (2006.01)
(52) U.S. Cl. ....................................... 706/47
(58) Field of Classification Search ............. 706/45–47, 706/62
See application file for complete search history.

(56) References Cited

U.S. PATENT DOCUMENTS

| | | | |
|---|---|---|---|
| 5,377,196 A * | 12/1994 | Godlew et al. ............. 714/712 |
| 7,107,186 B2 * | 9/2006 | Smiley et al. ............. 702/185 |
| 7,209,860 B2 | 4/2007 | Trsar et al. |
| 2004/0199307 A1 * | 10/2004 | Kipersztok et al. ............. 701/29 |
| 2005/0096874 A1 * | 5/2005 | Smiley et al. ............. 702/185 |
| 2006/0047789 A1 * | 3/2006 | Kumar et al. ............. 709/220 |
| 2006/0112061 A1 * | 5/2006 | Masurkar ............. 706/47 |
| 2006/0167856 A1 * | 7/2006 | Angele et al. ............. 707/3 |
| 2006/0200589 A1 | 9/2006 | Collins et al. |
| 2007/0094219 A1 * | 4/2007 | Kipersztok ............. 706/52 |
| 2009/0177495 A1 * | 7/2009 | Abousy et al. ............. 705/3 |

* cited by examiner

*Primary Examiner*—David R Vincent
(74) *Attorney, Agent, or Firm*—Haynes and Boone, LLP

(57) ABSTRACT

In an information handling system (IHS), IHS problem diagnosis and repair includes receiving configuration items of the IHS from a configuration management database, collecting a set of rules and corresponding actions relating to the configuration items of the IHS, the set of rules and corresponding actions collected from an expert system, collecting a prioritization of the set of rules and corresponding actions, filtering the set of rules and corresponding actions per the prioritization and based on a plurality of preferences, and sending the set of rules and corresponding actions to the IHS.

20 Claims, 3 Drawing Sheets

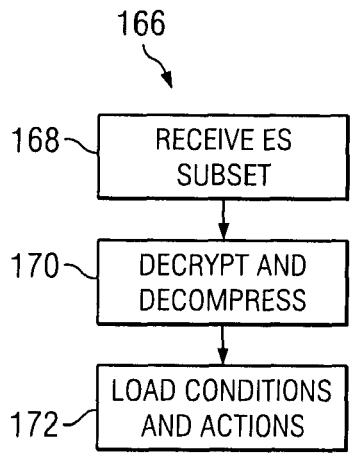
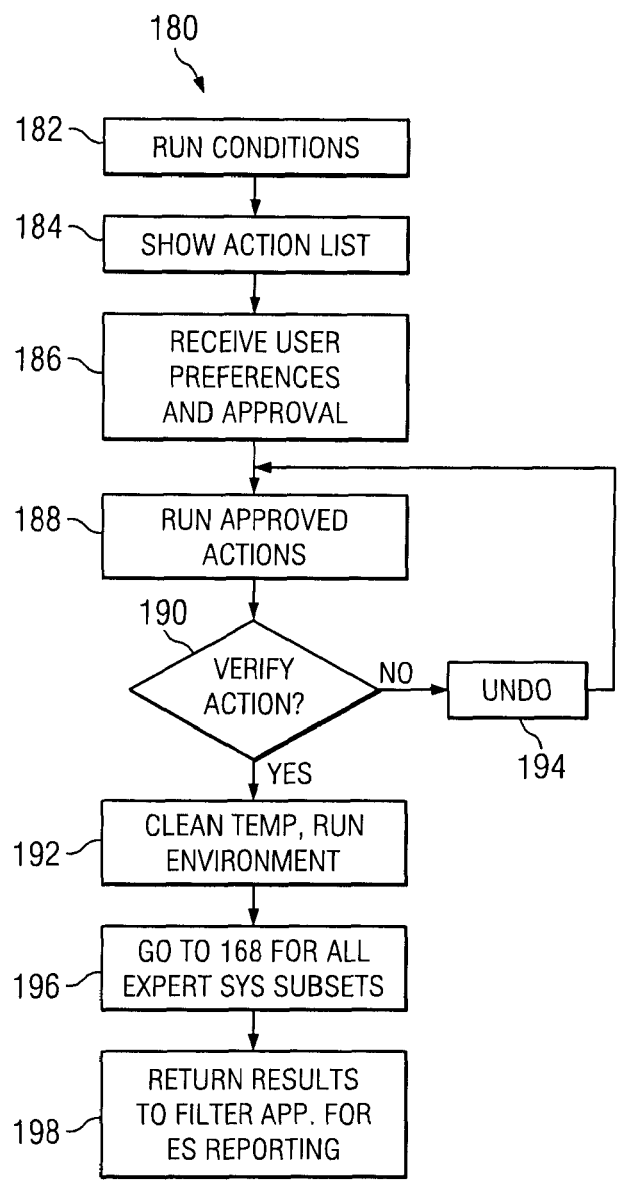
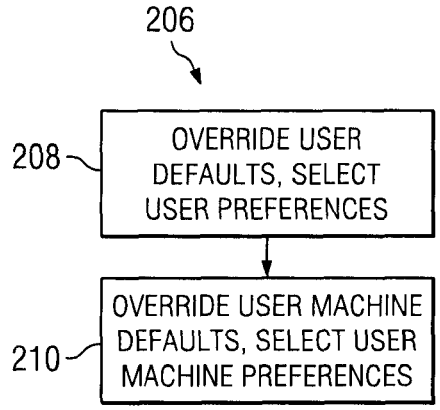

United States Patent — US 7,890,447 B2

INFORMATION HANDLING SYSTEM AND METHOD FOR DIAGNOSIS, AND REPAIR, USING RULES COLLECTED BY FORWARD CHAINING

BACKGROUND

The present disclosure relates generally to information handling systems, and more particularly to information handling system diagnosis, rules, and actions.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHS owners or operators experience a hardware of software problem at one time or another or need updates. Some IHS manufacturers provide online, live, and/or telephone support for such problems or updates. However, with many hundreds of millions of IHSs in operation throughout the world, with each one potentially having a different hardware and/or software configuration, solutions to these problems may be unique for each IHS. Thus, troubleshooting may be difficult for the IHS having such problems.

Technical service groups for the IHS manufacturers may record and report each successful solution to the problem for the IHS. As a result, the technical service groups generally know what solutions work best for given problems for specific configurations of IHS. From this, it is generally known that the top few solutions out of a list of all possible solutions works for repairing the IHS in most cases. However, a service technician generally has to go down the list of all possible solutions for a specific configuration until a correct solution is found. This is slow, and very cost intensive for technical service groups.

Accordingly, it would be desirable to provide for information handling system diagnosis, rules, and actions where the rules are recognized problems (generally understood as "ifs"), and actions are recognized as the repairs for the problems (generally understood as "thens").

SUMMARY

According to one embodiment, a method comprises receiving configuration items of the IHS from a configuration management database, collecting a set of rules and corresponding actions relating to the configuration items of the IHS, the set of rules and corresponding actions collected from an expert system, collecting a prioritization of the set of rules and corresponding actions, filtering the set of rules and corresponding actions per the prioritization and based on a plurality of preferences, and sending the set of rules and corresponding actions to the IHS.

BRIEF DESCRIPTION OF THE DRAWINGS

FIG. 3 illustrates an embodiment of a method for the IHS of FIG. 1 to load a expert system set of rules and actions.

FIG. 4 illustrates an embodiment of a method for the IHS of FIG. 1 to run an expert system set of rules and actions.

FIG. 5 illustrates an embodiment of a method for the IHS of FIG. 1 to set expert system preferences.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
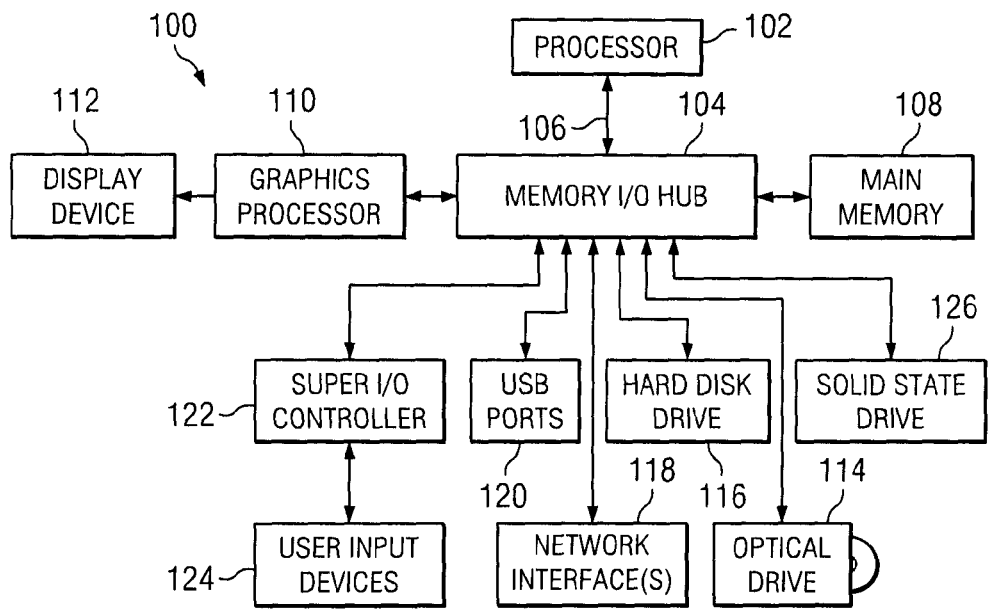
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
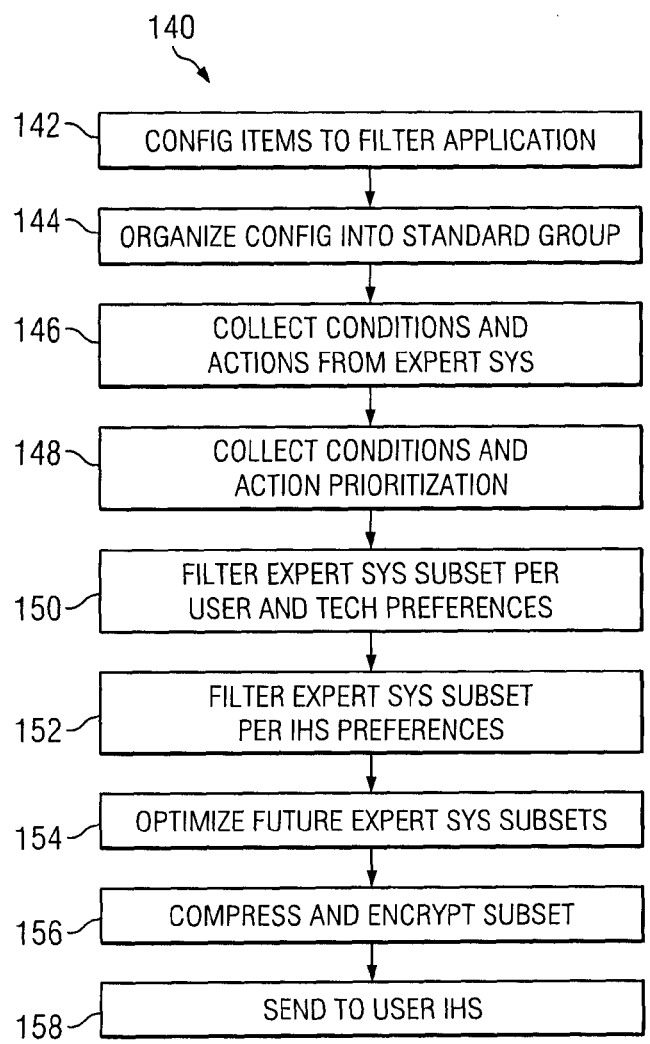
FIG. 2 illustrates an embodiment of a method for an expert system to supply the IHS of FIG. 1 with a set of rules and actions.

Referring now to FIG. 2, an embodiment of a method 140 for an expert system is provided to supply the IHS of FIG. 1 with a set of rules and actions. An expert system is knowledge based computer system having a database of knowledge and analytical skills (e.g., problem diagnosis, repair, and etc.) of human experts (e.g., technical service representatives). In an embodiment, an expert system is a computer program having a set of rules that analyze information about a group or class of known problems and provide analysis of the problem or problems found. The known problems may be coded in program structures, data structures, or a variety of other structures. In an embodiment, the expert system may recommend a course of action to implement corrections to the problems found. As such, an expert system may appear to have reasoning capabilities such as, artificial intelligence, to determine problems, and reach conclusions about one or more solutions to the problem or problems found. With regard to expert systems, rules are generally what give the expert system the ability to find one or more solutions to the problem or problems found. Similarly, in expert systems, actions are generally what give the expert system the ability to fix the problem or problems (e.g., the actions are the solution to the problem or problems). In a programming sense, the rules and actions are generally known as an "if-then" clauses. In other words, if the expert system uses the rule and finds X, then the expert system may recommend an action solution of Y.

The method 140 begins at block 142 where a filter application receives configuration items relating to an IHS 100 from a configuration management database (CMDB). In an embodiment, a filter application is an application that receives information, filters the information into an optimal form for the situation and passes the information along to another user of the information. For example, a filter application may receive a list of configuration items from a CMDB about an IHS 100, a set of all known possible solutions to an IHS 100 having the provided Configuration items, and a list of prioritizations for the known possible solutions. Then, the filter application may reduce, consolidate, order, and/or otherwise manipulate the set of the known possible solutions relative to the prioritizations for the Configuration items and then present the filtered set to the IHS 100. Configuration items may be identifiers of a configuration for the IHS 100. In an embodiment, a configuration item may be hardware and/or hardware revision information for the IHS 100. In an embodiment, a configuration item may be software and/or software revision information for the IHS 100. By knowing the Configuration items for an IHS 100, the problems occurring with the IHS 100 may be more easily understood or diagnosed by knowing solutions that have previously worked for the same or similar problems with similarly configured IHS 100s. A CMDB tracks and records Configuration items for an IHS 100 and details about attributes and relationships between the Configuration items. The CMDB may automatically or manually track information about the Configuration items. In an embodiment, a CMDB is a repository of information related to the components of an IHS 100. In an embodiment, a CMDB is the implementation of a database that contains details about the organization's information technology (IT) services. Being more than an asset register, of the hardware and software for an organization's IHS 100s, a CMDB may contain information that relates to the maintenance, movement, and problems experienced with the configuration items of the IHS 100s. Information held by a CMDB may range from hardware information, software information, documentation information, personnel information, and/or a variety of other information. A CMDB may have tasks to perform for maintaining information about the IHS 100s. For example, the tasks may relate to identification of IHS 100 components and their inclusion in the CMDB, control and management of Configuration items and specifying who is authorized to modify it, recording and maintaining status information of the Configuration items, and verification such as, review and audit of information to ensure accuracy of the information in the CMDB.

After the Configuration items are received by the filter application from the CMDB, the method 140 proceeds to block 144 where the filter application organizes set of Configuration items into a standardized group of Configuration items. The standardized group of Configuration items may be a list of a number of IHS 100 Configuration items having similar Configuration items to the IHS 100 at hand. Therefore, the number of sets of rules may be reduced to the number of sets approximating the number of standardized groups of Configuration items with similar Configuration items. Thus, because there are hundreds of millions of IHS 100s in the World, organizing the IHS 100's Configuration items into a standardized group having similar Configuration items, reduces the number of the possible solutions from possible solutions for all IHS configurations to the known solutions for the standardized group. In an embodiment, the method 140 skips block 144 and the filter application passes along all of the Configuration items for the IHS 100 without grouping them into a standardized group of similar Configuration items.

The method 140 then proceeds to block 146 where the filter application collects a set of known possible rules and their corresponding actions from the expert system. In an embodiment, the set of known possible rules and their corresponding actions is specific to the IHS 100 and in an embodiment, the set of known possible rules and their corresponding actions is reduced to a standardized group having similar Configuration items as described above with reference to block 144. The set of known possible rules and their corresponding actions may be compiled by service technicians, IHS 100 manufacturer administrators, user groups, customers, wiki groups, and/or a variety of other groups and stored in an expert system, staging pre-expert system database, and/or a variety of other systems. In addition, some rules and actions of the set of known possible rules and their corresponding actions may require approval from approvers, such as, IHS 100 manufacturer or software provider, before being allowed to be stored.

In an embodiment, the rules and actions may be reasoned using forward chaining or backward chaining. Forward chaining starts with available data about the problem to solve (e.g., the problem encountered by the IHS 100) and uses inferences to extract more data until an optimal goal is reached. An inference engine using forward chaining searches the inference rules until if finds one were the if clause is known to be true. Once found, the engine can conclude or infer the then clause, thereby resulting in the addition of new information to the dataset. The inference engine may cycle through this process until an optimal goal is reached.

Forward chaining may be called data driven reasoning. On the other hand, backward chaining may be referred to as goal driven because it begins with a list of goals and works backwards to see if there is data that will allow it to conclude any of the goals. Thus, a backward chaining engine searches the rules until it finds one which has a then clause that matches a desired goal. If the if clause of that inference rule is not known to be true, it is then added to the list of goals. Other types reasoning may be used with the systems and methods of the present application.

The method 140 then proceeds to block 148 where filter application collects a rules and actions prioritization to use to prioritize the set of rules and actions so the most relevant or most likely successful rule and action combination to fix the problem are executed with higher priority than less likely successful rule and action combinations. The prioritization may be derived from source such as, a technical service group database compiling the most common problems and fixes. The prioritization may be derived from a source such as user-defined priorities from the user of the IHS 100 such as, the top 20 problems and fixes at a time, the first X amount of data at a time, and/or a variety of other user-defined priorities.

After the filter application receives the prioritization, the method 140 then proceeds to block 150 where the filter application filters the set of known possible rules and their corresponding actions per the prioritization. Thus, the filter application may arrange the set of known possible rules and their corresponding actions from highest priority to lowest priority by having the most likely solution to the problem for an IHS 100 having these Configuration items first. In some cases, most commonly used rules and corresponding actions fix a majority of the problems encountered by an IHS 100 with the configuration item. Therefore, in an embodiment, the filter application may truncate the set of know possible rules and their corresponding actions to a top number of rules and corresponding actions.

Method 140 proceeds next to block 152 where the filter application filters the set of known possible rules and their corresponding actions based on machine preferences. Thus, if, for example, the IHS 100 having the problem has a configuration restricting a given amount of data to be received by the IHS 100 per a given time period, the filter application filters the set of known possible rules and their corresponding actions to only send the allowable amount of data per the time period so as to not overload the IHS 100. For example, if the IHS 100 configuration item prefers to cache only 1 MB of data at a time, the filter filters the set of known possible rules and their corresponding actions correspondingly. Other filtering criteria may be used to filter the set of known possible rules and their corresponding actions to optimize the set to speed up the system, reduce data sent over the network interface 118, improve likelihood of success repairing the problem, and/or a variety of other filter criteria.

Method 140 then proceeds to block 154 where the user of the IHS 100, the expert system, or others may select conditions to reduce quantity and size of future expert system sets of known possible rules and their corresponding actions. As a result, future sets of known possible rules and their corresponding actions may be further filtered with the filter application to narrow the focus of the set of rules and increase the likelihood of success for repairing the problem with less rules and actions. In an embodiment, the method 140 may not allow selecting conditions to reduce quantity and size of future expert system sets of known possible rules and their corresponding actions.

In an embodiment, the method 140 proceeds to block 156 where the set of known possible rules and their corresponding actions may be compressed to reduce the file size and/or the set of known possible rules and their corresponding actions may be encrypted to increase security for the data as are both commonly understood by those of ordinary skill in the art. In an embodiment, the method 140 may send the set of known possible rules and their corresponding actions to the IHS 100 without compressing or encrypting.

The method 140 ends at 158 where the method 140 sends the set of known possible rules and their corresponding actions to the IHS 100. In an embodiment, the IHS 100 may receive the an embodiment of a method for the IHS of FIG. 1 to load an authored expert system set of rules and actions via a network (e.g., the Internet) via the network interface 118.

Referring now to FIG. 3, an embodiment of a method 166 for the IHS 100 of FIG. 1 to load a expert system set of rules (e.g., runtime filters and/or services) and actions (e.g., diagnostics, alerts, scripts, content, drivers, updates, license information, and/or a variety of other items) is provided. The method 166 begins at block 168 where the IHS 100 receives the set of known possible rules and their corresponding actions as provided by the expert system and filtered by the filter application in method 140. In an embodiment, the IHS 100 receives the set of known possible rules and their corresponding actions over the Internet via the network interface 118. However, other networks, or media may be used for transferring the set of known possible rules and their corresponding actions to the IHS 100. The method next proceeds to block 170 where, if the set of known possible rules and their corresponding actions was compressed and/or encrypted, the IHS 100 decompresses and/or decrypts the set of known possible rules and their corresponding actions for performance on the IHS 100. After the set of known possible rules and their corresponding actions is decompressed and/or decrypted or If the set of known possible rules and their corresponding actions was not compressed and/or encrypted, the method 166 next proceeds to block 172 where the IHS loads the set of known possible rules and their corresponding actions for performance on the IHS 100 and the method 166 ends.

Referring now to FIG. 4, an embodiment of a method 180 for the IHS 100 of FIG. 1 to run an expert system set of rules and actions is provided. The method 180 begins at block 182 where the IHS 100 runs the set of known possible rules and their corresponding actions supplied to the IHS 100 in method 140 and/or method 166. The set of known possible rules and their corresponding actions may be ran automatically upon receipt by the IHS, or may require initiation/approval by a user of the IHS 100 to run. The method 180 then proceeds to block 184 where the IHS displays to the user an action list of actions recommended to run to correct the problem with the IHS. The action list may include other recommended actions not relating to a problem. In an embodiment, the user may select preferences for the action list and whether the IHS 100 is to perform all of the recommened actions displayed or if the user may select actions to perform from the list. The method 180 proceeds to block 186 where the method receives user preferences and/or approval to some or all of the actions displayed. The method 180 then proceeds to block 188 where the IHS 100 runs the approved actions. Running the approved actions may use the rules to diagnose the problem with the IHS and then use the corresponding actions to correct the problem with the IHS 100. In an embodiment, running the approved actions provides a revision update and/or service tags to the IHS 100. In an embodiment, running the approved actions provides any variety of information to the IHS. The method 180 then proceeds to block 190 where it is determined whether the actions have been verified. In an embodiment, verification includes determining whether the actions ran fix the problem with the IHS 100. If the action is not verified in block 190, the method 180 proceeds to block 194 where the method 180 reverses the actions performed in block 188 and the method 180 then returns to block 188. If the action is verified in block 190, the method 180 proceeds to block 192 where the method 180 cleans up the temporary run environment on the IHS 100 as is commonly understood by those of ordinary skill in the art for running actions on an IHS to return the IHS 100 back to a state of the IHS 100 before the set of rules was received by the IHS 100. After temporary run environment on the IHS 100 is cleaned in block 192, the method 180 then proceeds to block 196 where the method 180 returns to block 168 of method 166 to receive sets of rules from the expert system. The method then proceeds to block 198 where the results of the actions are supplied to the filter application for adding to the reporting database to help improve likelihood of success for future rules and actions and the method 180 ends.

Referring now to FIG. 5, an embodiment of a method 206 for the IHS 100 of FIG. 1 to set expert system preferences is provided. The method 206 begins at block 208 where the user of the IHS 100 may select for the expert system to override the user defaults. Thus, the user may select user preferences of, for example, compression and/or encryption of the rules and actions for sending and/or receiving the rules and actions from the expert system, auto run of the rules and actions so no user needs to be present to run the rules and actions, cache flush of the rules and actions after running them, manual approval or auto approval of the action items that are recommended to fix found problems with the IHS 100, manual or auto cleanup of the temporary run environment, and/or a variety of other preference options. The method 206 then proceeds to block 210 where the user of the IHS 100 may select for the expert system to override the user machine defaults. Thus, the user may select user machine preferences of, for example, size and synchronization frequency of initial expert system set of rules and actions, when needed, size and frequency of remaining expert system sets of rules and action. After the user has selected preferences in blocks 208 and/or 210, the method 206 ends.

Figure 6:
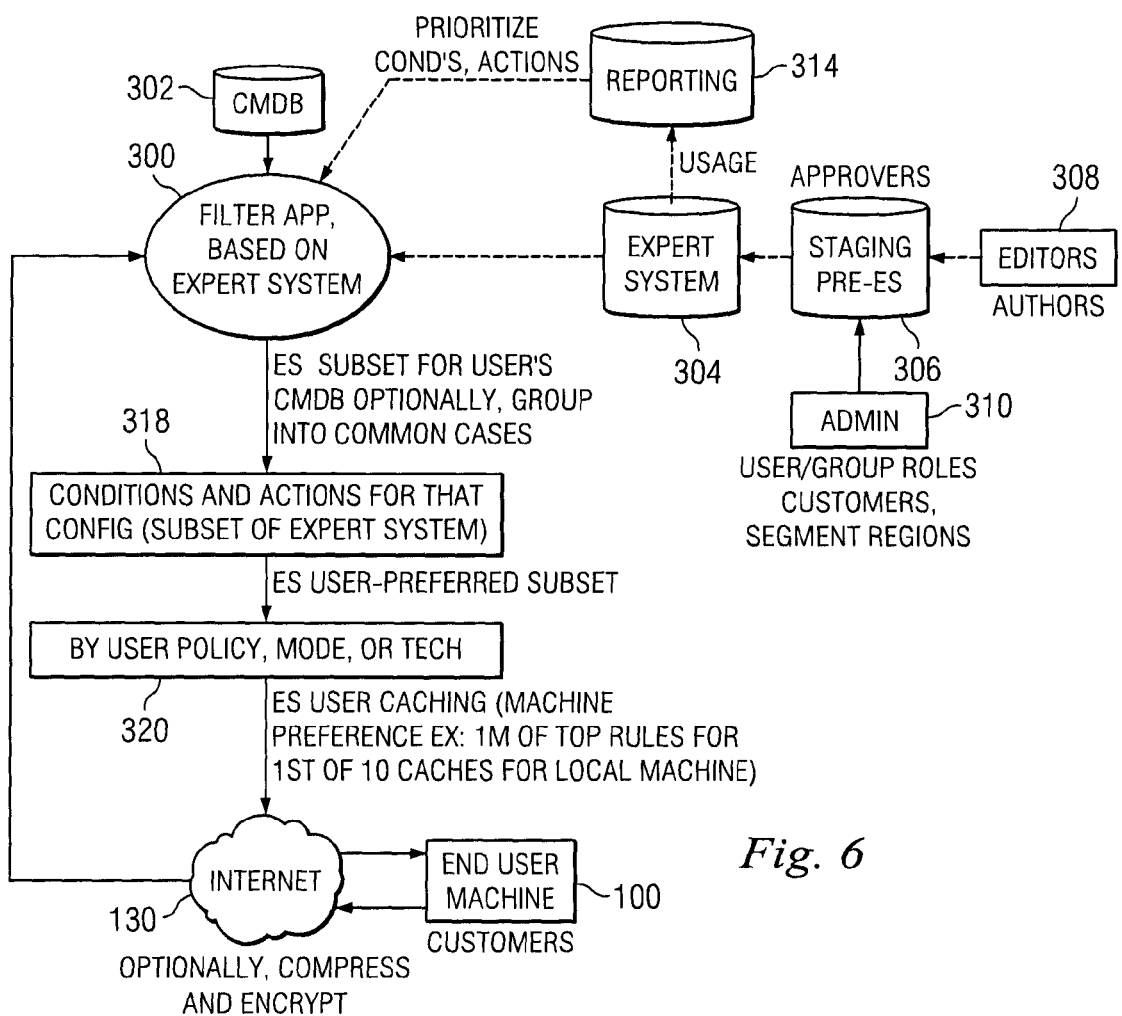
FIG. 6 illustrates an embodiment of a system for high-level authoring, loading, and running an expert system set of rules and actions.
Figure 7:
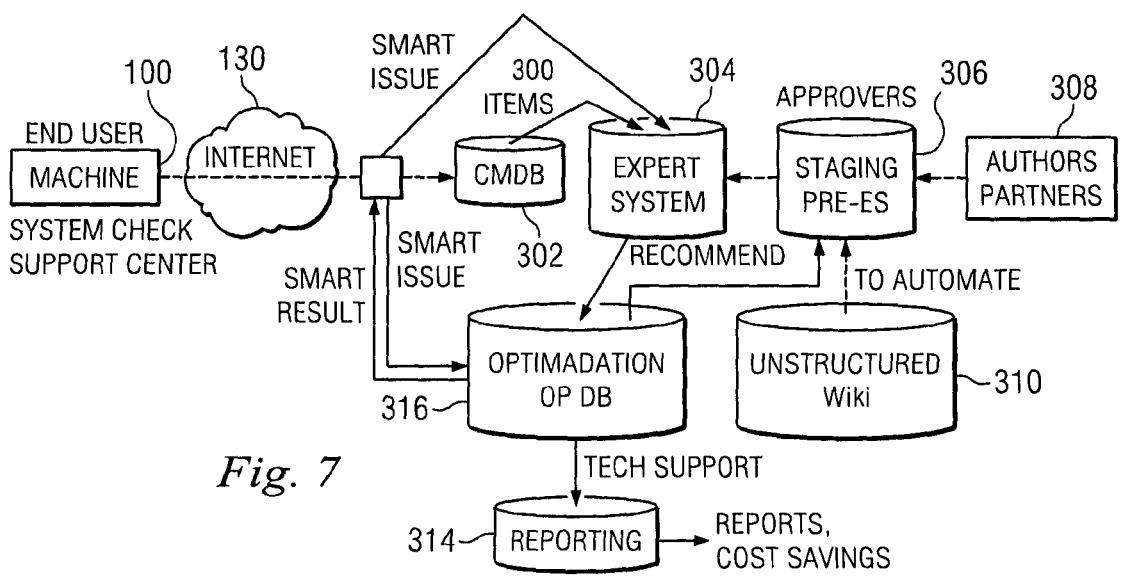
FIG. 7 illustrates an embodiment of a topology of a configuration management database and an expert system.

Referring now to FIGS. 6 and 7, an embodiment of a system for high-level authoring, loading, and running an expert system set of rules and actions and an embodiment of a topology of a configuration management database and an expert system are respectively provided. The systems of FIGS. 6 and 7 operate substantially as described above with reference to methods 140, 166, 180, and 206 of FIGS. 1-5. In this embodiment, the filter application 300 receives Configuration items relating to the IHS 100 from the CMDB 302 as described above with reference to block 142. The rules and actions used in the expert system 304 are authored by editors 308 and/or administrators 310 and input into a staging pre-expert system database 306 for storage and approval. In an embodiment, the editors 308 are technical service representatives or others for the IHS 100 manufacturer who understand potential problems with the IHS 100 and their corresponding solutions. Similarly, the administrators 310 may be IHS administrators, user groups, customers using the IHS, Wiki/public entry websites, and/or a variety of others familiar with the IHS 100 and their corresponding solutions. Once the proposed rules and actions are authored by the editors 308 and/or the administrators 310 and stored on the staging pre-expert system database 306, approvers review the proposed rules and associated actions for validity, success at solving IHS problems, and/or a variety of other factors. Unapproved rules and actions may be re-written by the approvers. Approved rules and actions are then used by the expert system 304 substantially similar to that described above with reference to FIGS. 2-5. A reporting database 314 may receive usage information from the expert system 304 relating to the usage and success of tried rules and actions. The reporting database 314 may then organize, sort, or otherwise manipulate the usage information from the expert system 304 to develop a prioritization of the rules and actions for use in the filter application 300 to focus the rules and actions sent to the IHS 100 depending on the symptoms perceived for the problem of the IHS 100. After receiving the set of rules and actions from the expert system 304 and the prioritization from the reporting database 314, the filter application 300 may group the Configuration items of the IHS into a standard group of similar IHSs with similar Configuration items to reduce need of rules and actions for every IHS configuration possible. The filter application 300 then has a set of rules and actions for the configuration of the IHS 100 with a high likelihood of success for fixing a problem on the IHS having the configuration of the IHS, or one similar, with the provided symptoms at 318. Next, the filter application 300 passes the set of rules and actions to 320 where the filter application 300 filters the set of rules per the IHS 100 preferences. After filtering the set of rules and actions, the system sends the set of rules and actions to the IHS 100 using the Internet 130 and/or any other information transfer system. As described above with reference to methods 140, 166, 180, and/or 206, the IHS 100 may reply to the filter application and/or the expert system. In an embodiment, an optimization database 316 receives information from the expert system 304 and the IHS 100 via the Internet 130 or other information transfer system and the optimization database 316 sends information to the staging pre-expert system database 306 and the IHS 100 via the Internet 130 or other information transfer system. Using the optimization database 316 allows the filter application 300 to optimize sets of rules and corresponding actions for configurations of IHSs 100.

Embodiments of the methods and systems of the present disclosure may be used with at least four modes: automated mode (the expert system and filter application run with little or no input by IHS 100 user or service technician); self help mode (the expert system and filter application run with IHS 100 user initiating and/or configuring); full mode (ran by the technical service representative and no input needed by the IHS 100 user); and assisted mode (input by both the IHS 100 user and the technical service representative are needed to run). In an embodiment, the filtering of the expert system is not limited by the CMDB 302 because the IHS 100 may do additional filtering to optimize conditions and actions. For example, the CMDB 302 may include a configuration item about the IHS 100, but a condition at the IHS 100 may determine additional information not in the CMDB 302 such as, the build number for the IHS 100 and thus provide additional filtering by the filter application 300 to eliminate the need for running unnecessary rules and actions. In an embodiment, XML tagging of the rules and actions may include designate user mode, role, permission, region, localization, severity, cost, live or cache modes, and a variety of other conditions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for information handling system (IHS) problem diagnosis and repair, the method comprising:
   receiving configuration items for a user IHS from a configuration management database that tracks and records the configuration items for the user IHS, details about attributes of the configuration items for the user IHS, and relationships between the configuration items for the user IHS;
   collecting a set of rules and corresponding actions from an expert system, wherein the set of rules and corresponding actions include all of a plurality of rules and corresponding actions in the expert system for an IHS having the received configuration items;
   prioritizing the set of rules and corresponding actions by assigning a higher priority to rules and corresponding actions that have been found to be more successful in diagnosing and repairing problems in an IHS having the received configuration items to create a set of prioritized rules and corresponding actions;
   filtering the set of prioritized rules and corresponding actions to create a set of filtered, prioritized rules and corresponding actions that includes a first subset of the prioritized rules and corresponding actions that are more commonly used with an IHS having the received configuration items relative to a second subset of the prioritized rules and corresponding actions that are not included in the set of filtered, prioritized rules and corresponding actions; and
   sending the set of filtered, prioritized rules and corresponding actions to the user IHS, wherein the user IHS is operable to use the set of filtered, prioritized rules and corresponding actions locally to diagnose and repair problems with the user IHS.

2. The method of claim 1, further comprising:
   grouping the configuration items for the user IHS into a standard configuration group.

3. The method of claim 1, wherein the set of rules and corresponding actions are collected using forward chaining.

4. The method of claim 1, wherein the configuration items include hardware information and software information for the user IHS.

5. The method of claim 1, wherein the configurations items include documentation information and personnel information for the user IHS.

6. The method of claim 1, further comprising:
   filtering the set of prioritized rules and corresponding actions using a cache limit.

7. The method of claim 1, further comprising:
   compressing and encrypting the set of filtered, prioritized rules and corresponding actions before sending the set of filtered, prioritized rules and corresponding actions to the user IHS.

8. A system for information handling system (IHS) problem diagnosis and repair, the system comprising at least one subsystem to:
   receive configuration items for a user IHS from a configuration management database that tracks and records the configuration items for the user IHS, details about attributes of the configuration items for the user IHS, and relationships between the configuration items for the user IHS;
   collect a set of rules and corresponding actions from an expert system, wherein the set of rules and corresponding actions include all of a plurality of rules and corresponding actions in the expert system for an IHS having the received configuration items;
   prioritize the set of rules and corresponding actions by assigning a higher priority to rules and corresponding actions that have been found to be more successful in diagnosing and repairing problems in an IHS having the received configuration items to create a set of prioritized rules and corresponding actions;
   filter the set of prioritized rules and corresponding actions to create a set of filtered, prioritized rules and corresponding actions that includes a first subset of the prioritized rules and corresponding actions that are more commonly used with an IHS having the received configuration items relative to a second subset of the prioritized rules and corresponding actions that are not included in the set of filtered, prioritized rules and corresponding actions; and
   send the set of filtered, prioritized rules and corresponding actions to the user IHS, wherein the user IHS is operable to use the set of filtered, prioritized rules and corresponding actions locally to diagnose and repair problems with the user IHS.

9. The system of claim 8, further comprising at least one subsystem to:
   group the configuration items for the user IHS into a standard configuration group.

10. The system of claim 8, wherein the set of rules and corresponding actions are collected using forward chaining.

11. The system of claim 8, wherein the configuration items include hardware information and software information for the user IHS.

12. The system of claim 8, wherein the configuration items include documentation information and personnel information for the user IHS.

13. The system of claim 8, further comprising at least one subsystem to:
   filter the set of prioritized rules and corresponding actions using a cache limit.

14. The system of claim 8, further comprising at least one subsystem to:
   compress and encrypt the set of filtered, prioritized rules and corresponding actions before sending the set of filtered, prioritized rules and corresponding actions to the user IHS.

15. An information handling system (IHS) comprising:
   a processor for processing instructions;
   a network interface; and
   a subsystem for connecting to a user IHS and an expert system via the network interface and using the processor to allow the user IHS to diagnose and repair issues with the user IHS, wherein the subsystem is operable to:
      receive configuration items for the user IHS from a configuration management database that tracks and records the configuration items for the user IHS, details about attributes of the configuration items for the user IHS, and relationships between the configuration items for the user IHS;
      collect the set of rules and corresponding actions from the expert system, wherein the set of rules and corresponding actions include all of a plurality of rules and corresponding actions in the expert system for an IHS having the received configuration items;
      prioritize the set of rules and corresponding actions by assigning a higher priority to rules and corresponding actions that have been found to be more successful in diagnosing and repairing problems in an IHS having the received configuration items to create a set of prioritized rules and corresponding actions; and filter the set of rules and corresponding actions to create a set of filtered, prioritized rules and corresponding actions that includes a first subset of the prioritized rules and corresponding actions that are more commonly used with an IHS having the received configuration items relative to a second subset of the prioritized rules and corresponding actions that are not included in the set of filtered, prioritized rules and corresponding actions; and send the set of filtered, prioritized rules and corresponding actions to the user IHS, wherein the user IHS is operable to use the set of filtered, prioritized rules and corresponding actions locally to diagnose and repair problems with the user IHS.

16. The IHS of claim 15, wherein the configuration items include hardware information and software information for the user IHS.

17. The IHS of claim 15, wherein the configuration items include documentation information and personnel information for the user IHS.

18. The IHS of claim 15, further comprising a subsystem to:

compress and encrypt the set of filtered, prioritized rules and corresponding actions before sending the set of filtered, prioritized rules and corresponding actions to the user IHS.

19. The IHS of claim 15, wherein the set of rules and corresponding actions are collected using forward chaining.

20. The IHS of claim 15, further comprising a subsystem to:

filter the set of prioritized rules and corresponding actions using a cache limit.

* * * * *